United States Patent
Kim et al.

(10) Patent No.: US 11,433,639 B2
(45) Date of Patent: Sep. 6, 2022

(54) LIGHTWEIGHT SANDWICH STEEL SHEET USING POLYAMIDE, AND MANUFACTURING METHOD THEREFOR

(71) Applicant: HANWHA CHEMICAL CORPORATION, Seoul (KR)

(72) Inventors: Dae Hak Kim, Seongnam-si (KR); Seung Hoe Do, Daejeon (KR); Jin Seo Lee, Seongnam-si (KR); Kyoung Won Yim, Buk-gu (KR); Kyung Ho Kwon, Daegu (KR); Do Kyoung Kim, Busan (KR); Hye Yeon Lee, Seoul (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 16/763,792

(22) PCT Filed: Nov. 1, 2018

(86) PCT No.: PCT/KR2018/013202
§ 371 (c)(1),
(2) Date: May 13, 2020

(87) PCT Pub. No.: WO2019/098578
PCT Pub. Date: May 23, 2019

(65) Prior Publication Data
US 2020/0384725 A1    Dec. 10, 2020

(30) Foreign Application Priority Data

Nov. 14, 2017 (KR) .................. 10-2017-0151261

(51) Int. Cl.
*B32B 5/20* (2006.01)
*B32B 27/08* (2006.01)
(Continued)

(52) U.S. Cl.
CPC .............. *B32B 5/20* (2013.01); *B32B 15/046* (2013.01); *B32B 15/18* (2013.01); *B32B 27/08* (2013.01);
(Continued)

(58) Field of Classification Search
CPC ................................ B32B 5/20; B32B 15/046
See application file for complete search history.

(56) References Cited

U.S. PATENT DOCUMENTS 3,682,847 A    8/1972 Gilch et al.
4,588,754 A *  5/1986 Liu ........................... C08J 9/10
                                                    521/125
(Continued)

FOREIGN PATENT DOCUMENTS

CN    1690103 A    11/2005
CN    1871126 A    11/2006
(Continued)

*Primary Examiner* — Hai Vo
(74) *Attorney, Agent, or Firm* — Sughrue Mion, PLLC (57) ABSTRACT

The present invention relates to a lightweight sandwich steel sheet using polyamide, and more particularly, to a lightweight sandwich steel sheet using polyamide and a manufacturing method therefor, the steel sheet being usable at a wider temperature range than that of a conventional sandwich steel sheet and, particularly, having excellent adhesion at a low temperature and remarkably increasing stability and lightweight property.

9 Claims, 3 Drawing Sheets

(51) Int. Cl.
    *B32B 15/18*     (2006.01)
    *B32B 15/04*     (2006.01)
    *B29K 105/04*    (2006.01)

(52) U.S. Cl.
    CPC ....... *B29K 2105/04* (2013.01); *B32B 2250/40* (2013.01); *B32B 2266/0257* (2013.01); *B32B 2305/022* (2013.01); *B32B 2605/08* (2013.01)

(56) References Cited

U.S. PATENT DOCUMENTS

| | | | |
|---|---|---|---|
| 4,692,475 A * | 9/1987 | Rowland | C08J 9/103 521/145 |
| 8,124,686 B2 | 2/2012 | Loyen et al. | |
| 2005/0197446 A1 | 9/2005 | Loyen et al. | |
| 2007/0166526 A1 | 7/2007 | Myard et al. | |
| 2010/0040902 A1 | 2/2010 | Mizrahi | |
| 2010/0233505 A1 | 9/2010 | Böger et al. | |
| 2014/0163139 A1* | 6/2014 | Wang | C08K 7/02 523/435 |
| 2014/0178633 A1 | 6/2014 | Kleinschmidt et al. | |
| 2018/0200993 A1 | 7/2018 | Jacquet | |
| 2019/0225765 A1* | 7/2019 | Cavalier | C08J 9/0028 |

FOREIGN PATENT DOCUMENTS

| | | |
|---|---|---|
| DE | 102007046226 A1 | 4/2009 |
| JP | 2002693732 A | 3/2002 |
| JP | 2007505772 A | 3/2007 |
| JP | 2007-231211 A | 9/2007 |
| JP | 2011-5724 A | 1/2011 |
| JP | 2011-26397 A | 2/2011 |
| JP | 4783184 B2 | 9/2011 |
| JP | 201217476 A | 1/2012 |
| JP | 5553542 B2 | 7/2014 |
| JP | 2018520026 A | 7/2018 |
| KR | 10-1990-0012757 A | 9/1990 |
| KR | 10-2011-0077854 A | 7/2011 |
| KR | 10-1204231 B1 | 11/2012 |
| KR | 10-2014-0016952 A | 2/2014 |

* cited by examiner

LIGHTWEIGHT SANDWICH STEEL SHEET USING POLYAMIDE, AND MANUFACTURING METHOD THEREFOR

CROSS REFERENCE TO RELATED APPLICATIONS

This application is a National Stage of International Application No. PCT/KR2018/013202 filed Nov. 1, 2018, claiming priority based on Korean Patent Application No. 10-2017-0151261 filed Nov. 14, 2017.

TECHNICAL FIELD

The present invention relates to a lightweight sandwich steel sheet using polyamide, and more particularly, to a lightweight sandwich steel sheet using polyamide and a manufacturing method therefor, the steel sheet being usable at a wider temperature range than that of a conventional sandwich steel sheet and, particularly, having excellent adhesion at a low temperature and remarkably increasing stability and lightweight property.

BACKGROUND ART

A polyamide resin is a linear polymer bonded by an amide (—NHCO—) bond and is a crystalline plastic having excellent mechanical properties and, particularly, impact resistance. In addition, the polyamide resin has excellent physical properties in terms of friction resistance, abrasion resistance, oil resistance, and solvent resistance and is easily melt-molded. Therefore, the polyamide resin is widely used as clothing materials, fibers for industrial materials, engineering plastics, and the like. Polyamides may be classified into aliphatic polyamides, aromatic polyamides, and aliphatic cyclic polyamides according to molecular structures. The aliphatic polyamides may be collectively referred to as nylon, and the aromatic polyamides may be collectively referred to as aramid.

Recently, while entering into the era of small quantity batch production, products gradually require various functions. In particular, the improvement in energy efficiency and quality of life is gradually emphasized. Since the functions of such products are difficult to satisfy with a single plate material, sandwich steel sheets in which two or more plate materials are bonded have attracted attention.

Sandwich steel sheets are intended to increase corrosion resistance and heat resistance while pursuing lightweight property. Sandwich steel sheets may be largely classified into vibration damping steel sheets and lightweight laminate steel sheets according to the thicknesses of resins and steel sheets. The vibration damping steel sheets are manufactured so as to increase vibration damping by using a resin layer between metals as an adhesive, and the lightweight laminate steel sheets are manufactured by rolling or pressing both surfaces of a nonferrous metal system as a base material with a metal plate material. Such sandwich steel sheets are used in many fields such as automobiles, aircrafts, ships, building materials, and home appliances. Therefore, research into moldability has been actively conducted.

The vibration damping steel sheets are a laminate of a viscoelastic resin or a vibration damping material between two steel sheets to a thickness of about 50 μm. The vibration damping steel sheets may be classified into steel sheets for room temperature, steel sheets for medium temperature, and steel sheets for high temperature according to the range of vibration damping performance.

In the lightweight laminate steel sheets, the thickness of the resin is greater than the thickness of one steel sheet and the steel sheet having a thickness of 0.3 mm or less is used. For weight reduction, a viscoelastic polymer resin is used as a composite material. The lightweight laminate steel sheets have recently attracted attention as a lightweight material for automobiles. In accordance with the trend of the weight reduction of the next generation automobiles, the sandwich steel sheets are expected to be used as automobile exterior materials such as hoods or doors so as to reduce the weight of the automobile exterior panel and secure the strength of the automobile.

In the case of the currently developed lightweight sandwich steel sheets, the thickness of a plastic material, which is mainly a core material, is greater than the thickness of a steel material of an exterior panel. Thus, the thickness of the sandwich steel sheet, in which all steel materials as the exterior panel materials are combined, is great.

In addition, the thickness of a steel material is greater than that of aluminum, which is applied as a lightweight exterior plate material for medium-sized or larger automobiles, the demand of which has been rapidly increasing. Therefore, the competitiveness of the weight reduction is deteriorated.

In addition, due to a stress gradient generated during heterogeneous bonding between the steel material and the plastic material constituting the lightweight sandwich steel sheet, delamination may occur between the steel material and the plastic material during molding.

Therefore, when providing lightweight sandwich steel sheets, there is a need to develop exterior plate materials for sandwich steel sheets, capable of reducing stress deviation to minimize a delamination problem, without a deterioration of physical properties such as strength, even when the thickness of a steel material, which is an exterior plate material, is further reduced.

Materials for solving the above problems and manufacturing sandwich steel sheets having excellent mechanical strength, excellent adhesion, and excellent weight reduction are constantly required, and there is a need for improvement.

DESCRIPTION OF EMBODIMENTS

Technical Problem

The present invention has been made in an effort to solve the above-described problems.

The present invention provides a lightweight sandwich steel sheet using polyamide, in which a lightweight property is remarkably increased as compared with a conventional sandwich steel sheet, and a manufacturing method therefor.

Another object of the present invention is to provide a lightweight sandwich steel sheet, which can provide excellent stability even at a low temperature by using a long chain polyamide and can be used at a wider temperature range than a conventional sandwich steel plate to reduce the risk of breakage and delamination, and a manufacturing method therefor.

Still another object of the present invention is to provide a lightweight sandwich steel sheet having a low bonding temperature and excellent adhesion due to the use of a long chain polyamide as compared with a conventional material such as PET or PC, and a manufacturing method therefor.

Further another object of the present invention is to provide a lightweight sandwich steel sheet using polyamide, in which a long chain polyamide powder is used to form a highly stable porous plastic intermediate layer in which fine pores are uniformly distributed, and the time required for processing is shortened to make a manufacturing process simpler, and a manufacturing method therefor.

Solution to Problem

In order to achieve the above-described objects of the present invention and achieve the characteristic effects of the present invention described below, the characteristic construction of the present invention is as follows.

A lightweight sandwich steel sheet using polyamide according to the present invention includes: a plastic intermediate layer; and steel sheets disposed above and below the plastic intermediate layer, wherein the plastic intermediate layer is a porous layer including a long chain polyamide.

A method for manufacturing a lightweight sandwich steel sheet according to the present invention includes: (a) preparing a long chain polyamide powder through an anionic polymerization reaction, in the presence of a mineral spirit solvent, on a mixture prepared by mixing laurolactam (LL), and based on 100 parts by weight of the laurolactam, 0.01 parts by weight to 20 parts by weight of an alkali metal as an initiator, 0.3 parts by weight to 10 parts by weight of a molecular weight controller, 0.01 parts by weight to 5 parts by weight of silica as a nucleating agent, 0.002 parts by weight to 10 parts by weight of octadecyl isocyanate as an activator, and 0.001 parts by weight to 1 part by weight of carbon dioxide as a coactivator; (b) preparing a mixture of a plastic intermediate layer by uniformly mixing 1 part by weight to 10 parts by weight of a foaming agent based on 100 parts by weight of the long chain polyamide; and (c) laminating the mixture to 1 to 3 times the thickness of a steel sheet and manufacturing a sandwich steel sheet through hot press at a temperature of 180° C., to 250° C.

Advantageous Effects of Disclosure

In a lightweight sandwich steel sheet and a manufacturing method therefor, a weight reduction is remarkably increased as compared with a conventional sandwich steel sheet, the lightweight sandwich steel sheet can be used at a wider temperature range, and the risk of breakage and delamination is reduced.

In the lightweight sandwich steel sheet using polyamide and the manufacturing method therefor according to the present invention, since a long chain polyamide is used, the bonding temperature is lower than that of a conventional material such as PET or PC and the adhesion is excellent.

In the lightweight sandwich steel sheet using polyamide and the manufacturing method therefor, a long chain polyamide powder is used to form a highly stable porous plastic intermediate layer in which fine pores are uniformly distributed, and the time required for processing is shortened to make a manufacturing process simpler.

BEST MODE

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

Also, it will be understood that although the terms "first", "second", etc. may be used herein to describe various components, these components should not be limited by these terms. These terms are only used to distinguish one component from another.

Hereinafter, embodiments of the present invention will be described with reference to the accompanying drawings, so that those of ordinary skill in the art can easily carry out the present invention.

The present invention provides a lightweight sandwich steel sheet using polyamide and a manufacturing method therefor. In the present invention, the term "sandwich steel sheet" refers to a steel sheet in which a plastic material is included between two or more steel materials, as shown in FIG. 1.

Figure 1:
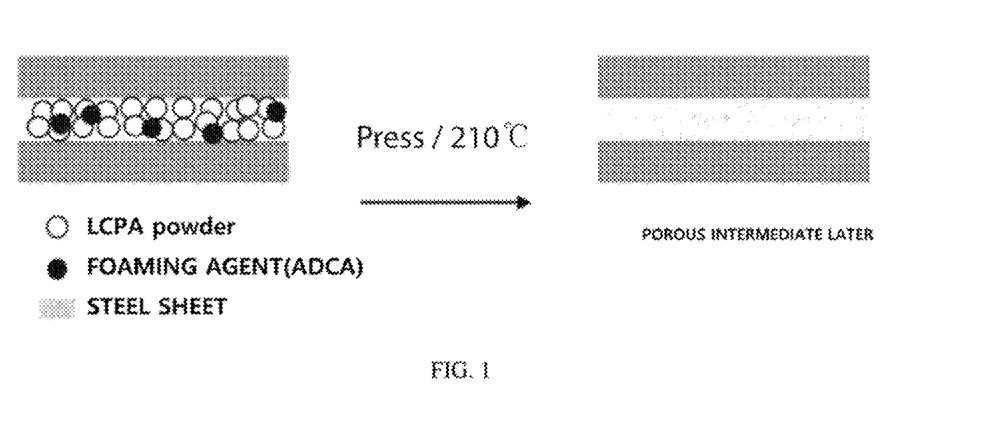
FIG. 1 is a cross-sectional view showing a lightweight sandwich steel sheet using polyamide, which is manufactured according to the present invention.

FIG. 1 is a cross-sectional view showing a lightweight sandwich steel sheet using polyamide according to the present invention. The lightweight sandwich steel sheet using polyamide according to the present invention includes a plastic intermediate layer and steel sheets disposed above and below the plastic intermediate layer. The plastic intermediate layer is a porous layer including a long chain polyamide (LCPA).

The plastic intermediate layer includes part by weight to 10 parts by weight of a foaming agent based on 100 parts by weight of the long chain polyamide.

The long chain polyamide may use at least one selected from a pellet form, a sheet form, and a powder form.

In the long chain polyamide, a diameter of a powder form is in a range of 10 μm to 100 μm. When the diameter of the powder form is less than 10 μm, the fluidity of particles is too large, making it difficult to laminate the steel sheet. When the diameter of the powder form is greater than 100 μm, it is difficult to uniformly mix with the foaming agent, thus deteriorating the stability of the porous layer.

The types of long chain polyamides (PA) are classified according to the chemical structure. The plastic intermediate layer to be used for the lightweight sandwich steel sheet according to the present invention may be manufactured by using at least one selected from PA11, PA12, PA1212, PA1010, PA1012, PA610, PA612, PA9T, and PA10T. In particular, PA12 has the lowest moisture absorption rate among the types of polyamides. Due to this, it may exhibit excellent physical properties in high temperature and high humidity conditions, as compared with other materials. In addition, since it is excellent in terms of impact resistance, chemical resistance, and processability, it is widely modified and used as a plasticizer and a reinforcing agent.

The foaming agent has a particle diameter of 10 μm to 100 μm. When the particle diameter of the foaming agent is outside the above range, it may be difficult to manufacture a highly stable plastic layer when mixing with polyamide.

Foaming agents are classified into chemical foaming agents and physical foaming agents using thermally expandable fine particles. The chemical foaming agents are largely classified into organic chemical foaming agents and inorganic chemical foaming agents. The foaming agents are an additive for mixing with a polymer to prepare a porous foam. When the foaming agent is added to a plastic or a rubber and an appropriate temperature and pressure are applied thereto, it is thermally decomposed to form a fine foam structure. The fine foam structure formed in this way provides effects such as high elasticity, high tension characteristics, thermal insulation effect, specific gravity reduction, sound insulation, and shock absorption, and its range of use is wide. For example, the fine foam structure may be used for vehicle bumpers, interior materials, packaging materials, life jackets, shoes, and floor decoration materials.

The foaming agent according to the present invention is a chemical foaming agent that mixes with a composition for manufacturing a plastic intermediate layer to impart porosity to the plastic intermediate layer. In this case, a long chain polyamide of a fine powder form may be preferably used so as to enable uniform mixing with the foaming agent, and a porous plastic intermediate layer in which fine pores are uniformly distributed may be manufactured. Therefore, a long chain polyamide having a powder particle diameter of 10 μm to 100 μm may be preferably used. In addition, since the powder form is used, a melting time is shorter than that of a pellet or a sheet, thereby obtaining an effect of reducing a hot press time to 1/10.

Examples of the organic foaming agent that is added according to the manufacturing method of the present invention may include at least one selected from the group consisting of azodicarbonamide (ADCA), N,N-dinitroso pentamethylene tetramine (DPT), and hydrazodicarbonamide (HDCA), but the present invention is not limited thereto.

However, in order to enable uniform mixing with the polymer to form the porous plastic intermediate layer in which fine pores are uniformly distributed, the foaming agent having a particle diameter of 10 μm to 100 μm may be preferably used. In addition, in order to enable foaming in the manufacturing process, the foaming temperature is preferably 180° C., to 250° C., according to the characteristics of the foaming agent. Specifically, the foaming temperature of the ADCA is 210° C., the foaming temperature of the DPT is 210° C., and the foaming temperature of the HDCA is 245° C.

The method for manufacturing the lightweight sandwich steel sheet using polyamide according to the present invention includes: (a) preparing a long chain polyamide powder having a particle diameter of 10 μm to 100 μm through an anionic polymerization reaction, in the presence of a mineral spirit solvent, on a mixture prepared by mixing laurolactam (LL), and based on 100 parts by weight of the laurolactam, 0.01 parts by weight to 20 parts by weight of an alkali metal as an initiator, 0.3 parts by weight to 10 parts by weight of a molecular weight controller, 0.01 parts by weight to 5 parts by weight of silica as a nucleating agent, 0.002 parts by weight to 10 parts by weight of octadecyl isocyanate as an activator, and 0.001 parts by weight to 1 part by weight of carbon dioxide as a coactivator; (b) preparing a mixture of a plastic intermediate layer by uniformly mixing 1 part by weight to 10 parts by weight of a foaming agent based on 100 parts by weight of the long chain polyamide; and (c) laminating the mixture to 1 to 3 times the thickness of a steel sheet and manufacturing a sandwich steel sheet through hot press at a temperature of 180° C., to 250° C.

First, the laurolactam according to the present invention may be preferably used as a monomer for preparing polyamide. However, the present invention is not limited thereto. For example, the laurolactam may include caprolactam, piperidone, pyrrolidone, enantolactam, and caprylactam. In some cases, the laurolactam may include propiolactam, 2-pyrrolidone, valerolactam, caprolactam, heptanolactam, octanolactam, nonanolactam, decanolactam, undecanolactam, and dodecanolactam.

In addition, the alkali metal catalyst according to the present invention is an initiator for preparing the polyamide and may include at least one selected from the group consisting of metal hydride, metal hydroxide, and metal alkoxide as a compound that allows the formation of the laurolactam anion.

In a specific example, the metal hydride may include sodium hydride and potassium hydride, the metal hydroxide may include sodium hydroxide and potassium hydroxide, and the metal alkoxide may include potassium tert-butoxide and aluminum isopropoxide, but the present invention is not limited thereto.

The metal catalyst may be used in the form of a solid or a solution, and the catalyst is preferably used in the form of a solid. The catalyst is preferably added to a caprolactam melt in which the catalyst can be dissolved. These catalysts lead to particularly rapid reactions, thereby increasing the efficiency of the process for preparing the polyamide according to the present invention.

According to the present invention, an amount of the alkali metal catalyst may be in a range of 0.01 parts by weight to 20 parts by weight based on 100 parts by weight of the entire laurolactam. In this case, when the alkali metal catalyst is added in an amount of less than 0.01 parts by weight, unpolymerization may occur or a reaction rate may decrease. When the amount of the alkali metal catalyst exceeds 20 parts by weight, a low-molecular-weight polymer may be generated. Therefore, the above range is preferable.

Next, the molecular weight controller according to the present invention may preferably be ethylene-bis-stearamide (EBS), but the present invention is not limited thereto. According to the present invention, an amount of the molecular weight controller may be in a range of 0.3 parts by weight to 10 parts by weight based on 100 parts by weight of the entire laurolactam. The amount of the molecular weight controller may be in a range of preferably 0.4 parts by weight to 7.0 parts by weight, and more preferably 0.5 parts by weight to 3.0 parts by weight.

In this case, when the molecular weight controller is added in an amount of less than 0.3 parts by weight, a high-molecular-weight polymer may be generated or a gelation problem may occur. When the amount of the molecular weight controller exceeds 10 parts by weight, a low-molecular-weight polymer may be generated or unpolymerization may occur. Therefore, the above range is preferable.

Finally, according to the present invention, the activator preferably includes octadecyl isocyanate, and the coactivator preferably includes carbon dioxide. According to the present invention, an amount of the octadecyl isocyanate may be in a range of 0.002 parts by weight to 10 parts by weight based on 100 parts by weight of the entire laurolactam. The amount of the octadecyl isocyanate may be in a range of preferably 0.005 parts by weight to S parts by weight, and more preferably 0.01 parts by weight to 0.1 parts by weight. In this case, when the octadecyl isocyanate is added in an amount of less than 0.002 parts by weight, unpolymerization may occur or a reaction rate may decrease. When the amount of the octadecyl isocyanate exceeds 10 parts by weight, a particle aggregation phenomenon may occur. Therefore, the above range is preferable. An amount of the carbon dioxide may be in a range of 0.001 parts by weight to 1 part by weight based on 100 parts by weight of the entire laurolactam. The amount of the carbon dioxide may be in a range of preferably 0.002 parts by weight to 0.5 parts by weight, and more preferably 0.005 parts by weight to 0.05 parts by weight. In this case, when the carbon dioxide is added in an amount of less than 0.001 parts by weight, the effect of improving a reaction rate is not great. When the amount of the carbon dioxide exceeds 1 part by weight, a gelation problem may occur. Therefore, the above range is preferable.

When preparing the long chain polyamide, the anionic polymerization reaction may be performed at a temperature of 180° C., to 250° C., within a range of 10 minutes to 60 minutes, but the present invention is not limited thereto.

In addition, when preparing the mixture of the plastic intermediate layer in the step (b), 1 part by weight to 10 parts by weight of the foaming agent may be included based on 100 parts by weight of the long chain polyamide. The amount of the foaming agent may be in a range of preferably 2 parts by weight to 8 parts by weight, and more preferably 4 parts by weight to 6 parts by weight.

In this case, when the foaming agent is added in an amount of less than 1 part by weight, a distribution of fine pores formed by the foaming agent may be low and a weight reduction improvement effect may be slight. When the amount of the foaming agent exceeds 10 parts by weight, too many pores may be generated to deteriorate the stability of the plastic intermediate layer. Therefore, the above range is preferable.

In addition, the method for manufacturing the lightweight sandwich steel sheet according to the present invention includes forming fine pores by foaming a foaming agent at a temperature of 180° C., to 250° C., for 10 seconds to 5 minutes in the step (c) according to the characteristics of the foaming agent used, thereby forming a porous plastic intermediate layer.

Hereinafter, the structure and operation of the present invention will be described in more detail with reference to preferred examples of the present invention. However, these example are shown by way of illustration and should not be construed as limiting the present invention in anyway.

Since contents not described herein can be sufficiently technically inferred by those of ordinary skill in the art, descriptions thereof will be omitted.

EXAMPLES

Example 1: Preparation of Lightweight Sandwich Steel Sheet Using Long Chain Polyamide (LCPA) Powder In order to remove moisture from a flask, a vacuum was released from the flask that was maintained at 60° C., in a vacuum state, a mixture prepared by mixing 20 g of laurolactam, 0.15 g of EBS, 0.06 g of NaH, and 0.2 g of silica is maintained at a reaction temperature of 130° C. for 15 minutes in the presence of a mineral spirit solvent. 0.5 ml of octadecyl isocyanate was injected for 10 minutes and 60 ml of carbon dioxide was injected. Then, a reaction was performed for 1 hour. As shown in Table 1, as a result of a PA12 conversion rate test over time, it was confirmed that, when 60 ml of carbon dioxide was injected, laurolactam showed a high PA12 conversion rate of 95% or more even after 1 hour.

Figure 3:
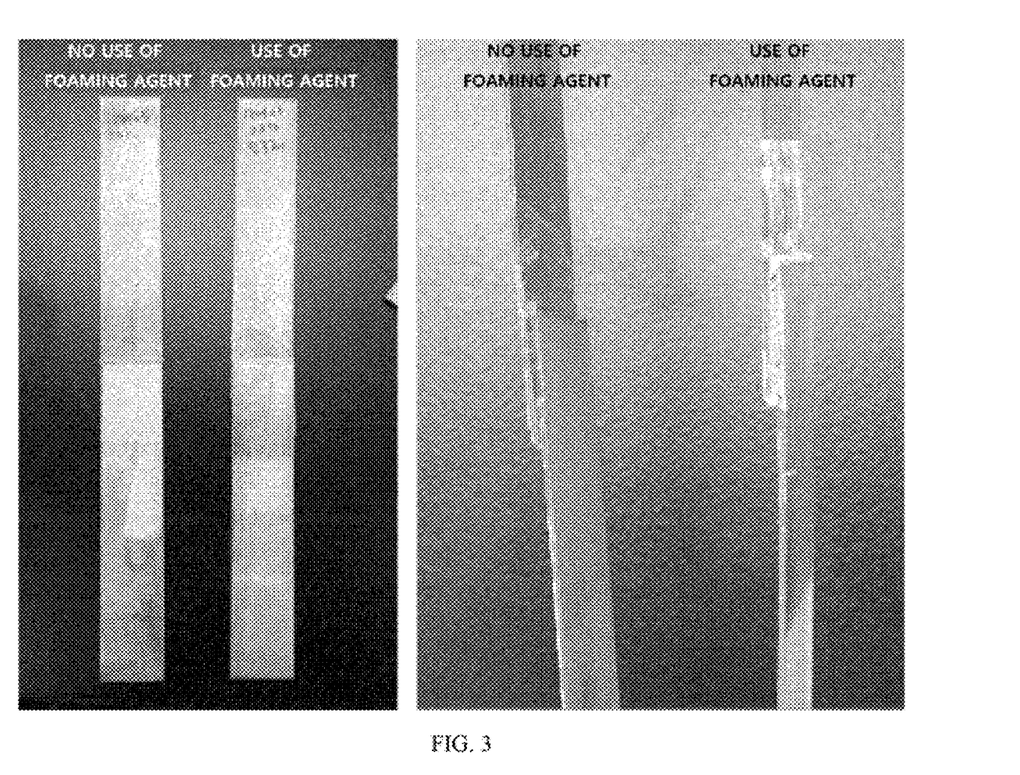
FIG. 3 is a photograph showing an adhesion test specimen of a sandwich steel sheet manufactured according to an embodiment of the present invention.

The long chain polyamide (PA12) obtained from the anionic polymerization reaction and having a powder particle diameter of 10 μm to 100 μm was used. A mixture of a plastic intermediate layer was prepared by uniformly mixing 5 parts by weight of the foaming agent ADCA based on 100 parts by weight of the long chain polyamide. The mixture was laminated to twice the thickness of a steel sheet. Then, a sandwich steel sheet specimen as shown in FIG. 3 was manufactured through hot press at a temperature of 210° C.

PA12 Conversion Rate Over Time when Carbon Dioxide was Injected

TABLE 1

| Amount of CO$_2$ injected | Laurolactam → PA12 conversion rate over time | | |
|---|---|---|---|
| | 1 hour | 3 hours | 5 hours |
| 0 | 44% | 78% | 99% |
| 60 ml | 98% | 99% | 99% |

Example 2: Preparation of Lightweight Sandwich Steel Sheet Using Long Chain Polyamide (LCPA) Pellet A sandwich steel sheet was manufactured in the same manner as in Example 1, except that a long chain polyamide (PA12) pellet was used.

Comparative Example 1

A sandwich steel sheet was manufactured in the same manner as in Example 1, except that a PET powder was used.

Comparative Example 2

A sandwich steel sheet was manufactured in the same manner as in Example 1, except that a PC powder was used.

EXPERIMENTAL EXAMPLES

Experimental Example 1: Adhesion Measurement Result

TABLE 2

| Materials | Example 1 | Example 2 | Comparative Example 1 | Comparative Example 2 |
|---|---|---|---|---|
| Bonding temperature (° C.) | 190 | 190 | 280 | 300 |
| Adhesion (MPa) | 3.78 | 4.10 | 0.46 | 0.26 |

It was confirmed from the adhesion measurement result of Table 2 that the bonding temperatures of Example 1 using the PA12 powder prepared according to the present invention and Example 2 using the PA12 pellet prepared according to the present invention were remarkably low and exhibited excellent adhesion, as compared with Comparative Examples 1 and 2.

Figure 2:
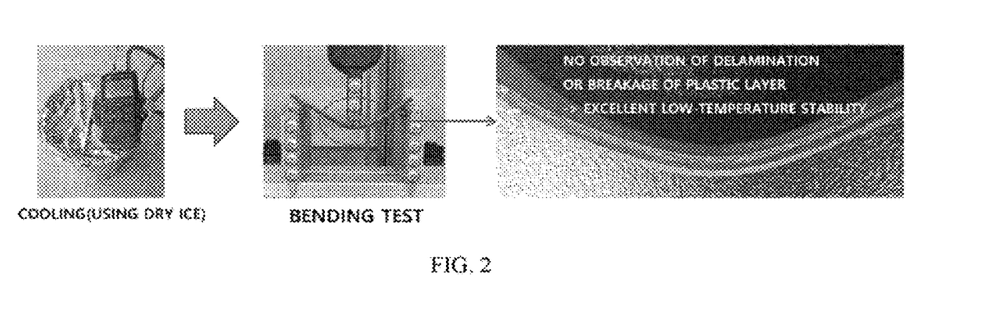
FIG. 2 is a photograph showing a low temperature stability test according to an embodiment of the present invention.

In addition, as a result of confirming stability through a bending test at a low temperature of −30° C., in FIG. 2, when PBT, PET, or PC was used as a plastic intermediate layer, there was a probability that the plastic intermediate layer would be easily broken or delaminated at a low temperature of −20° C., or lower. However, when the long chain polyamide prepared according to the present invention was used as the plastic intermediate layer, no delamination or breakage of the plastic intermediate layer was observed. Therefore, the excellent low-temperature stability was confirmed.

Therefore, the sandwich steel sheet in which the long chain polyamide prepared according to the present invention is used as the plastic intermediate layer may maintain excellent characteristics at a wide temperature range of −30° C., to −170° C. Therefore, it is confirmed that the sandwich steel sheet according to the present invention is applicable to products (e.g., automobiles) exposed to various climates. In addition, the sandwich steel sheet may be manufactured at a low temperature as compared with materials such as PBT, PET, or PC, thereby obtaining the effect of reducing the manufacturing cost.

Experimental Example 2: Adhesion and Density Measurement Result

TABLE 3

| Materials | Amount of foaming agent (wt %) | Molding time (min) | Adhesion (MPa) | Bulk density of intermediate layer (g/cm$^3$) |
|---|---|---|---|---|
| Example 1 | 5 | 0.5 | 3.78 | 0.8 |
| Comparative Example 2 | 0 | 5 | 0.26 | 1.02 |

It was confirmed from the adhesion test result in Table 3 that the adhesion was excellent when using the plastic intermediate layer prepared by mixing a polyamide (PA12) powder and a foaming agent at a weight ratio of 95:5 according to the present invention. Example 1 using the foaming agent has a low density, as compared with Comparative Example 2.

Figure 4:
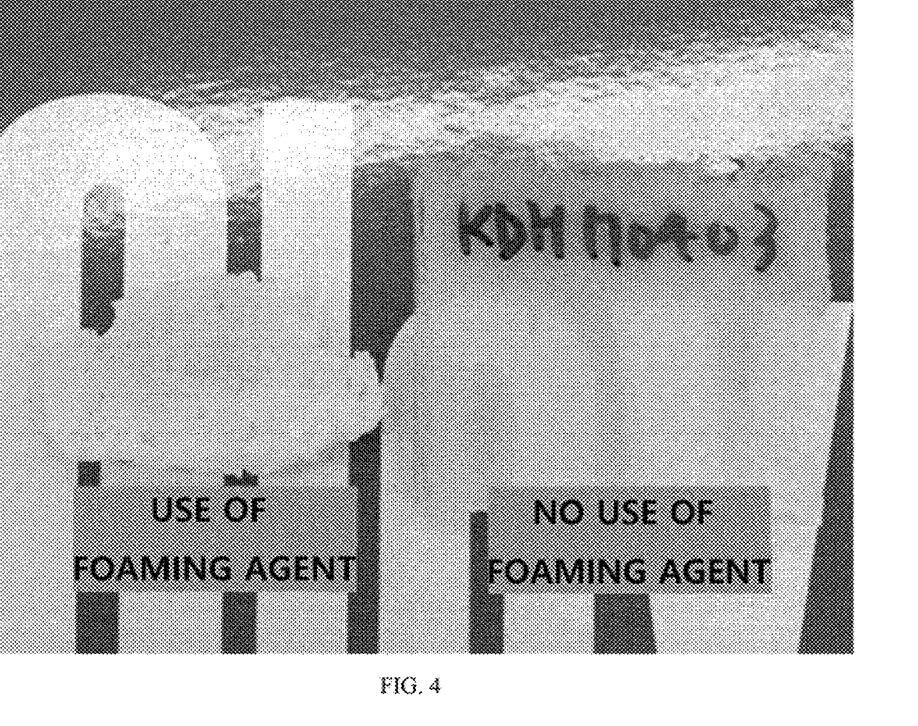
FIG. 4 is a photograph for comparing the shapes of plastic intermediate layers according to whether a foaming agent is used, according to an embodiment of the present invention.

In addition, in FIG. 4, as a result of comparing the shapes of the plastic intermediate layers according to whether the foaming agent was used, it was confirmed that the transparency was reduced when the foaming agent was used. It was confirmed that since the fine polyamide powder was uniformly mixed with the foaming agent powder, it was possible to form the porous plastic intermediate layer in which fine pores were uniformly distributed. Therefore, due to the use of the foaming agent according to the present invention, it was possible to improve the weight reduction of the sandwich steel sheet and obtain the porous plastic intermediate layer having high stability through uniform mixing with the fine polyamide powder.

Meanwhile, when the conventional plastic material of the pellet form or the sheet form was used without the foaming agent, the improvement in the weight reduction was considerably limited, and when the foaming agent was used, cracks occurred and the adhesion was deteriorated. In addition, when the polyamide powder according to the present invention is used, a melting time is shorter than that of the pellet form or the sheet form, thereby obtaining an effect of significantly reducing a hot press time to 1/10.

In the lightweight sandwich steel sheet using polyamide and the manufacturing method therefor according to the present invention, the porosity is imported to the plastic intermediate layer by the foaming agent. Therefore, compared with the conventional sandwich steel sheet, the weight may be significantly reduced and the lightweight sandwich steel sheet may be used in a wide temperature range. In particular, as shown in FIG. 2, there is an effect that the risk of breakage and delamination is reduced by excellent stability even at a low temperature.

In addition, in the lightweight sandwich steel sheet using polyamide and the manufacturing method therefor according to the present invention, since the long chain polyamide is used as shown in Table 2, the bonding temperature is lower than that of a conventional material such as PET or PC and the adhesion is excellent.

In addition, in the lightweight sandwich steel sheet using polyamide and the manufacturing method therefor according to the present invention, since the long chain polyamide powder is used, it is uniformly mixed with the foaming agent. Therefore, as shown in FIG. 4, the fine pores that are uniformly distributed may be formed and the plastic intermediate layer having high stability may be formed.

Furthermore, when the polyamide powder according to the present invention is used, the melting time is shorter than that of the pellet form or the sheet form, thereby shortening the time required for the processing and making the manufacturing process simpler.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

The invention claimed is:

1. A lightweight sandwich steel sheet comprising a polyamide, comprising:
   a plastic intermediate layer; and
   steel sheets disposed above and below the plastic intermediate layer,
   wherein the plastic intermediate layer is a porous layer including the polyamide, wherein the polyamide is a long chain polyamide and the long chain polyamide has a powder diameter of 30 μm to 100 μm,
   the plastic intermediate layer comprises a network of the long chain polyamide powders bonded to each other, and a plurality of pores uniformly distributed in the network, and
   the plastic intermediate layer comprises 2 parts by weight to 10 parts by weight of a foaming agent based on 100 parts by weight of the long chain polyamide.

2. The lightweight sandwich steel sheet of claim 1, wherein the long chain polyamide is at least one selected from polyamide 11, polyamide 12, polyamide 1212, polyamide 1010, polyamide 1012, polyamide 610, polyamide 612, polyamide 9T, and polyamide 10T.

3. The lightweight sandwich steel sheet of claim 1, wherein the foaming agent has a particle diameter of 10 μm to 100 μm.

4. A method for manufacturing the lightweight sandwich steel sheet according to claim 1, the method comprising:
   (a) preparing a long chain polyamide powder through an anionic polymerization reaction, in the presence of a mineral spirit solvent, on a mixture prepared by mixing laurolactam (LL), and based on 100 parts by weight of the laurolactam, 0.01 parts by weight to 20 parts by weight of an alkali metal as an initiator, 0.3 parts by weight to 10 parts by weight of a molecular weight controller, 0.01 parts by weight to 5 parts by weight of silica as a nucleating agent, 0.002 parts by weight to 10 parts by weight of octadecyl isocyanate as an activator, and 0.001 parts by weight to 1 part by weight of carbon dioxide as a coactivator;

(b) preparing a mixture of a plastic intermediate layer by uniformly mixing 2 parts by weight to 10 parts by weight of a foaming agent based on 100 parts by weight of the long chain polyamide; and (c) laminating the mixture to 1 to 3 times the thickness of a steel sheet and manufacturing a sandwich steel sheet through hot press at a temperature of 180° C. to 250° C., wherein, in the step (a), the long chain polyamide has a particle diameter of 30 μm to 100 μm, and the plastic intermediate layer comprises a network of the long chain polyamide powders bonded to each other, and a plurality of pores uniformly distributed in the network.

5. The method of claim 4, wherein, in the step (a), the long chain polyamide is at least one selected from polyamide 11, polyamide 12, polyamide 1212, polyamide 1010, polyamide 1012, polyamide 610, polyamide 612, polyamide 9T, and polyamide 10T.

6. The method of claim 4, wherein, in the step (a), the alkali metal comprises at least one selected from the group consisting of metal hydride, metal hydroxide, and metal alkoxide.

7. The method of claim 4, wherein, in the step (b), the foaming agent comprises at least one selected from the group consisting of azodicarbonamide, N,N-dinitroso pentamethylene tetramine, and hydrazodicarbonamide.

8. The method of claim 4, wherein, in the step (b), the foaming agent has a particle diameter of 10 μm to 100 μm.

9. The method of claim 4, wherein the step (c) comprises foaming the foaming agent at a temperature of 180° C. to 250° C. for 10 seconds to 5 minutes to form a porous plastic intermediate layer.

\* \* \* \* \*